United States Patent
Havimäki et al.

(12) 
(10) Patent No.: US 6,345,651 B1
(45) Date of Patent: Feb. 12, 2002

(54) DELIMBING AND CUTTING HEAD OF A HARVESTING MACHINE

(75) Inventors: Esko Havimäki, Mieto; Pentti Kaloinen, Pirkkala, both of (FI)

(73) Assignee: Partek Forest OY AB, Tampere (FI)

( * ) Notice: Subject to any disclaimer, the term of this patent is extended or adjusted under 35 U.S.C. 154(b) by 0 days.

(21) Appl. No.: 09/590,990

(22) Filed: Jun. 9, 2000

(30) Foreign Application Priority Data

Jun. 9, 1999 (FI) .................................................. 991318

(51) Int. Cl.$^7$ ............................................ A01G 23/095
(52) U.S. Cl. ...................................... 144/24.13; 144/4.1
(58) Field of Search .............................. 144/24.13, 338, 144/340, 341, 208.7, 4.1

(56) References Cited

U.S. PATENT DOCUMENTS

| | | | |
|---|---|---|---|
| 4,222,420 A | * | 9/1980 | Karlsson .................. 144/24.13 |
| 4,919,175 A | * | 4/1990 | Samson .................... 144/24.13 |
| 5,186,227 A | * | 2/1993 | Eriksson ................... 144/24.13 |
| 5,735,325 A | * | 4/1998 | Timperi et al. .......... 144/24.13 |
| 5,785,101 A | * | 7/1998 | Wildey .................... 144/24.13 |

FOREIGN PATENT DOCUMENTS

FI 82898 10/1991

* cited by examiner

Primary Examiner—Ed Tolan
(74) Attorney, Agent, or Firm—Steinberg & Raskin, P.C.

(57) ABSTRACT

The present invention relates to a delimbing and cutting head of a harvesting machine, including a body (22) mounted tiltably and rotatably on the machine boom, which body is provided with a pair of grip arms (14,16) articulatedly mounted on the body (22), grip arms (14,16) being sharpened along at least on one edge so that they simultaneously serve as delimbing blades, a cutting saw (19), and a pair of drive wheels (100). Each drive wheel (100) including a hub liner (101), an elastic material layer (102) has been adhered around the hub liner, first and second fixing flanges (112,113) each arranged along an axially side of the wheel, each of the flanges including a plurlity of thorughbores each adapted for receiving a chain therethrough, and pins (119) for securing each end of each chain to one of the first and second fixing flanges. In this way, the chains can be secured to the first and second fixing flanges and pretightened in place to compress the elastic material layer in an axial direction.

14 Claims, 3 Drawing Sheets

DELIMBING AND CUTTING HEAD OF A HARVESTING MACHINE

FIELD OF THE INVENTION

The present invention relates to a delimbing and cutting head of a harvesting machine of the type having a body adapted to be mounted on a boom of the harvesting machine.

BACKGROUND OF THE INVENTION

Currently used harvesting machines, harvesters, multi-process machines or equivalent are provided, as is known in the art, with equipment with which the trees are cut down, delimbed and cut to size. For functions like these, the machine is provided with a delimbing and cutting head mounted on a boom of the harvesting machine. It is standard practice to provide the delimbing and cutting head with grip arms to grip a tree trunk and with a chain saw or equivalent to cut the trunk. The grip arms are usually provided with a sharp edge so that they can simultaneously serve as delimbing blades. The delimbing and cutting heads are furthermore provided with drive rollers or wheels with a drive mechanism, which grip the trunk on opposite sides thereof and with which the trunk can be moved longitudinally so that when the trunk is being moved the delimbing blades can carry out the delimbing. Furthermore, modem delimbing and cutting heads are provided with measuring devices, such as a measuring wheel or wheels, with which lengths of the tree can be measured and determined. A selected length of the trunk can then be cut to size with the chain saw. In addition, the delimbing and cutting head is provided with rotating and turning machinery, with which said head can be turned as desired, and a tilting machinery or equipment, with which the delimbing and cutting head can be placed in desired position. The above functions are in general hydraulically operated.

On the delimbing and cutting head, drive wheels of various types are used. First, such drive wheels made entirely of metal are used that are provided with non-skid means, such as spikes, roughenings or the like. With such wheels a very good grip can be achieved to the trunk, but the grip of the wheels is highly aggressive so that considerable breaking of the timber and detaching of bark takes place. These in turn cause blueing of the timber and mold damage, requiring a greater use of chemicals in manufacturing paper and/or pulp.

To make the contact between the drive wheel and the trunk "softer", a design has used in which the drive wheel comprises a hub made of metal, such as a sleeve-like hub, upon which a solid-rubber tire is fixed by curing. Since with a rubber tire of this type, no sufficient grip can be establish, non-skid means are arranged upon the rubber. Most frequently, said non-skid means comprise chains or chain nets attached to the flanges in the hub, or of chain nets tightened on top of the rubber layer. To further enhance the grip of the tire, the chains may be square or sharp in cross-section. On the other hand, the non-skid means may be composed of planar pieces with spikes or equivalent items arranged on top of the tire, said pieces being mountable on the flanges of the hub with the aid of chains. Furthermore, these can be, when using chains and chain nets, fixed to the wheel in a manner similar to that used in fixing non-skid chains on the wheels of work machines, that is, by tightening the chains or cables in the direction of the circumference.

A drawback and problem of rubber wheels provided with said non-skid means of the type described above relates to the attachment of the non-skid means on top of the wheel. That is, the non-skid chains and plates tend to turn and tilt on top of the wheel, which causes skidding and/or breaking and detaching of the tree bark, which damages the timber. Particularly in the spring, at so-called bast time, it is very important that a secure yet gentle grip of the trunk be obtained with the drive wheels of the delimbing and cutting head, because the layer on the trunk surface is soft and easily damaged.

OBJECTS AND SUMMARY OF THE INVENTION

The objective of the present invention is to provide a delimbing and cutting head for a harvesting machine, which includes drive wheels for gripping the trunk which will not cause damage to the trunk or will significantly reduce the amount of damage caused to the trunk as compared to the damage caused by conventional devices. To this end, the invention is mainly characterized in that the drive wheel is provided with fixing means arranged on the axial ends of the drive wheel so when that the chains are fixed to said fixing means and pretightened in place the compress the elastic material layer of the drive wheel in an axial direction.

As compared to the state of the art, the present invention also achieves the significant benefit that the drive wheels will not cause any substantial damage to the trunks or that the damage caused thereby to the trunks is significantly reduced. This is based on the inventive manner in which the chains forming the non-skid means have been arranged and at-tached to the drive wheel so that they remain in the position as intended, without turning or twisting, while allowing the elasticity required, which is provided by the rubber surface of the wheels. The other advantages and characteristic features of the invention are apparent from the detailed description of the invention herein.

BRIEF DESCRIPTION OF THE DRAWINGS

In the following, the invention will be described in more detail with reference to the figures in the accompanying drawings, wherein.

DETAILED DESCRIPTION OF THE INVENTION

Figure 1:
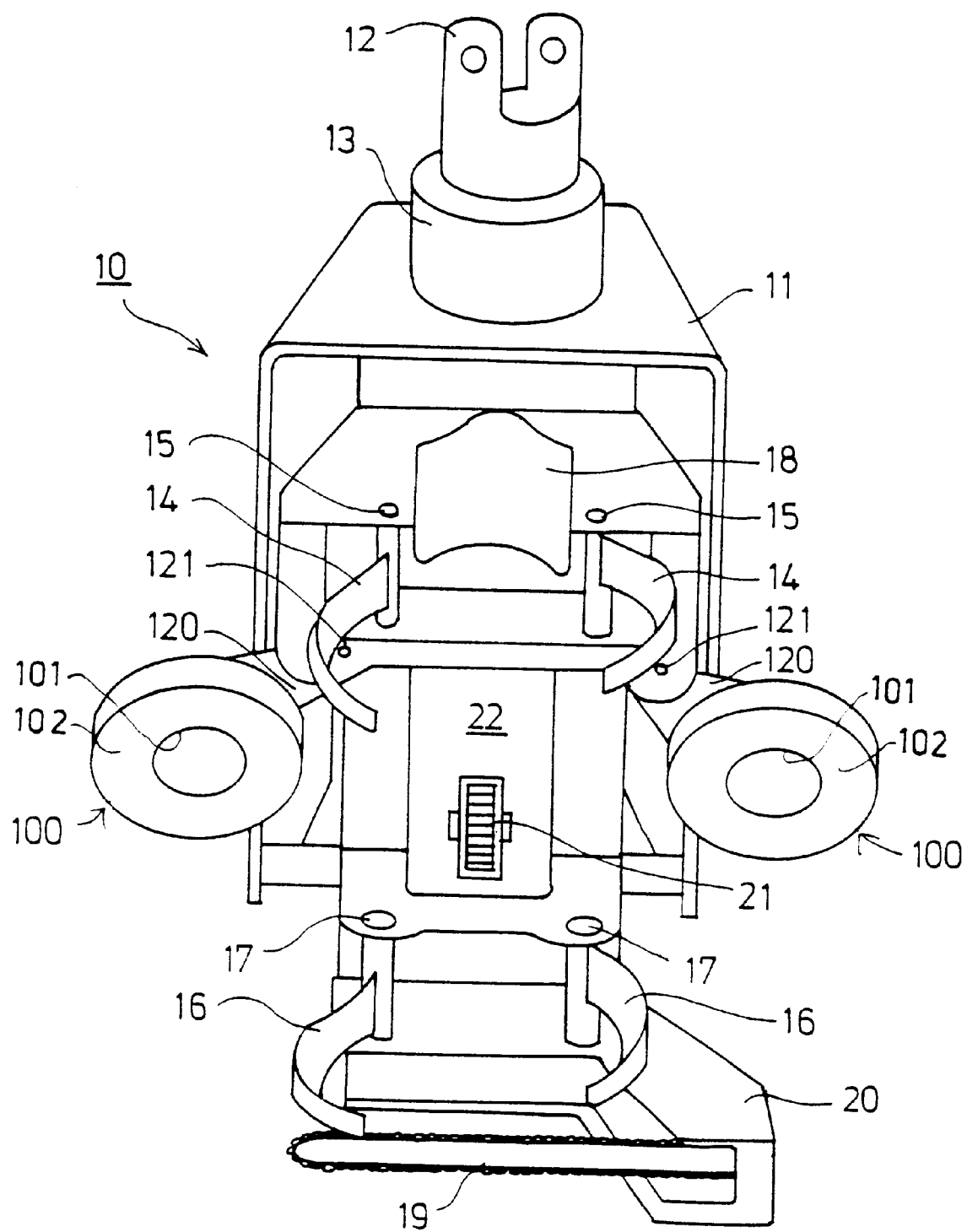
FIG. 1 schematically depicts a delimbing and cutting head of a harvesting machine in accordance with the invention.

In FIG. 1, the delimbing and cutting head of the present invention is indicated generally by the reference numeral 10. The delimbing and cutting head 10 is provided with a tilting framework 11, in which a rotating machinery 13 and fixing means 12 have been arranged. The delimbing and cutting head is rotatably mounted on the boom of the harvesting machine (not shown). The rotating machinery 13 is preferably a hydraulically operated rotating motor. The tilting framework 11 is turnably articulated to the body 22 of the delimbing and cutting head by a pivoting axle, this being preferably transversely arranged relative to the rotary axle of the rotating machinery 13. Furthermore, hydraulic power equipment (not shown) is arranged between the tilting framework 11 and the body 22, whereby the body 22 and the tilting frame-work 11 can be turned and tilted relative to each other.

The body 22 of the delimbing and cutting head is provided a first and second pair of hydraulically-operated grip arms 14 and 16. The grip arms are mounted articulately on the body 22 of the delimbing and cutting head by pivotable axles 15,17, by which the grip arms 14,16 can be pivoted with the aid of the hydraulic power means, such as hydraulic cylinders (not shown), for gripping a tree trunk. The pivoting grip arms 14,16 are sharpened on one edge so that they simultaneously serve as delimbing blades for delimbing tree trunk. Furthermore, a fixed or articulated delimbing blade 18 is advantageously mounted on the body of the delimbing and cutting head so that the tree trunk can be delimbed as effectively as possible along its entire circumference. Further, the delimbing and cutting head is provided with a cutting saw 19, being most often a chain saw like one shown in the figure, which is mounted to be turnable within the protective casing 20 of the chain saw. In addition, the delimbing and cutting head is provided with a measuring wheel 21 to enable the tree trunk to be cut with the cutting saw 19 at desired lengths.

Figure 2A:
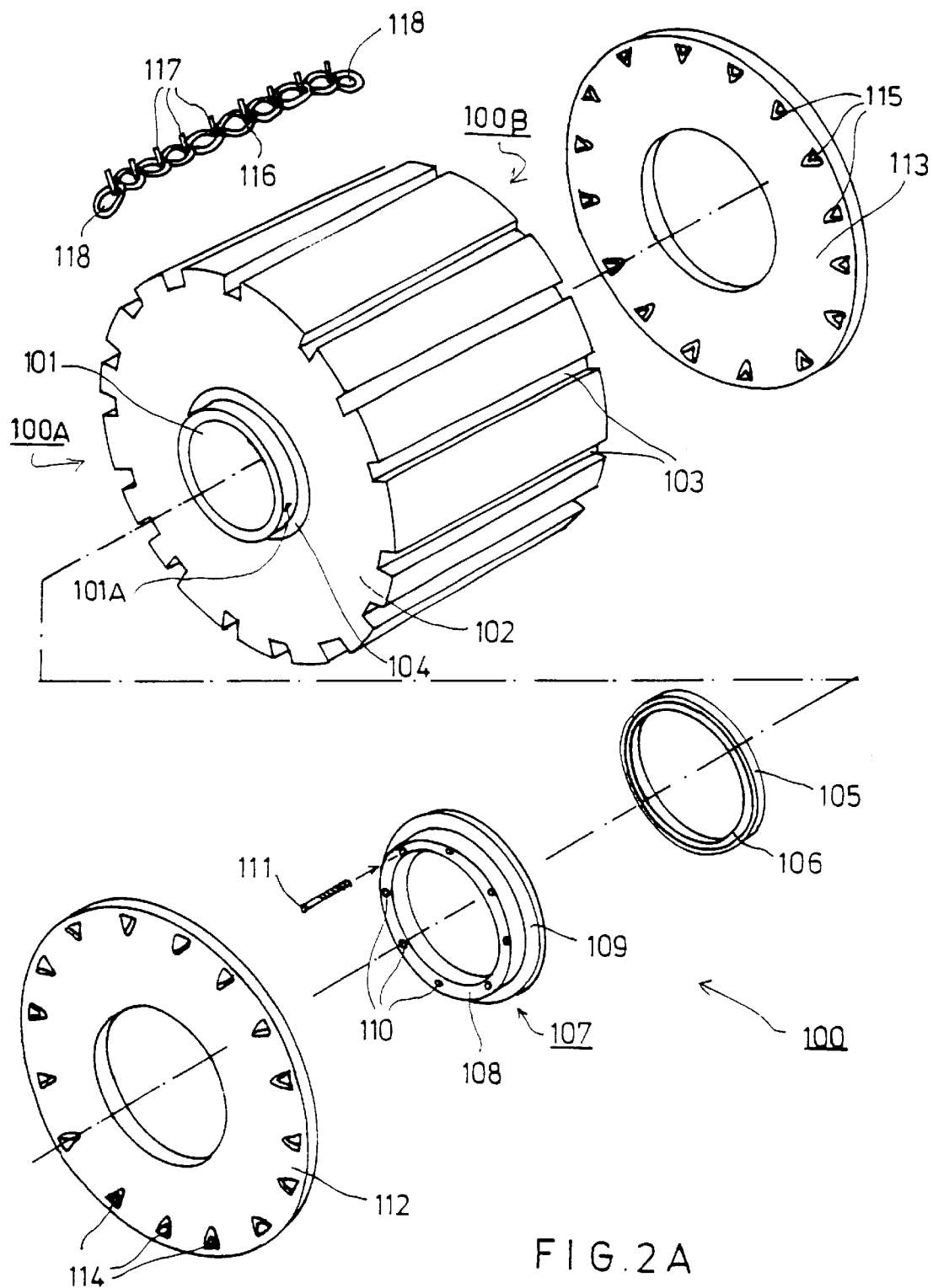
FIG. 2A is an assembly drawing of a drive wheel of the delimbing and cutting head in accordance with the present invention.
Figure 2B:
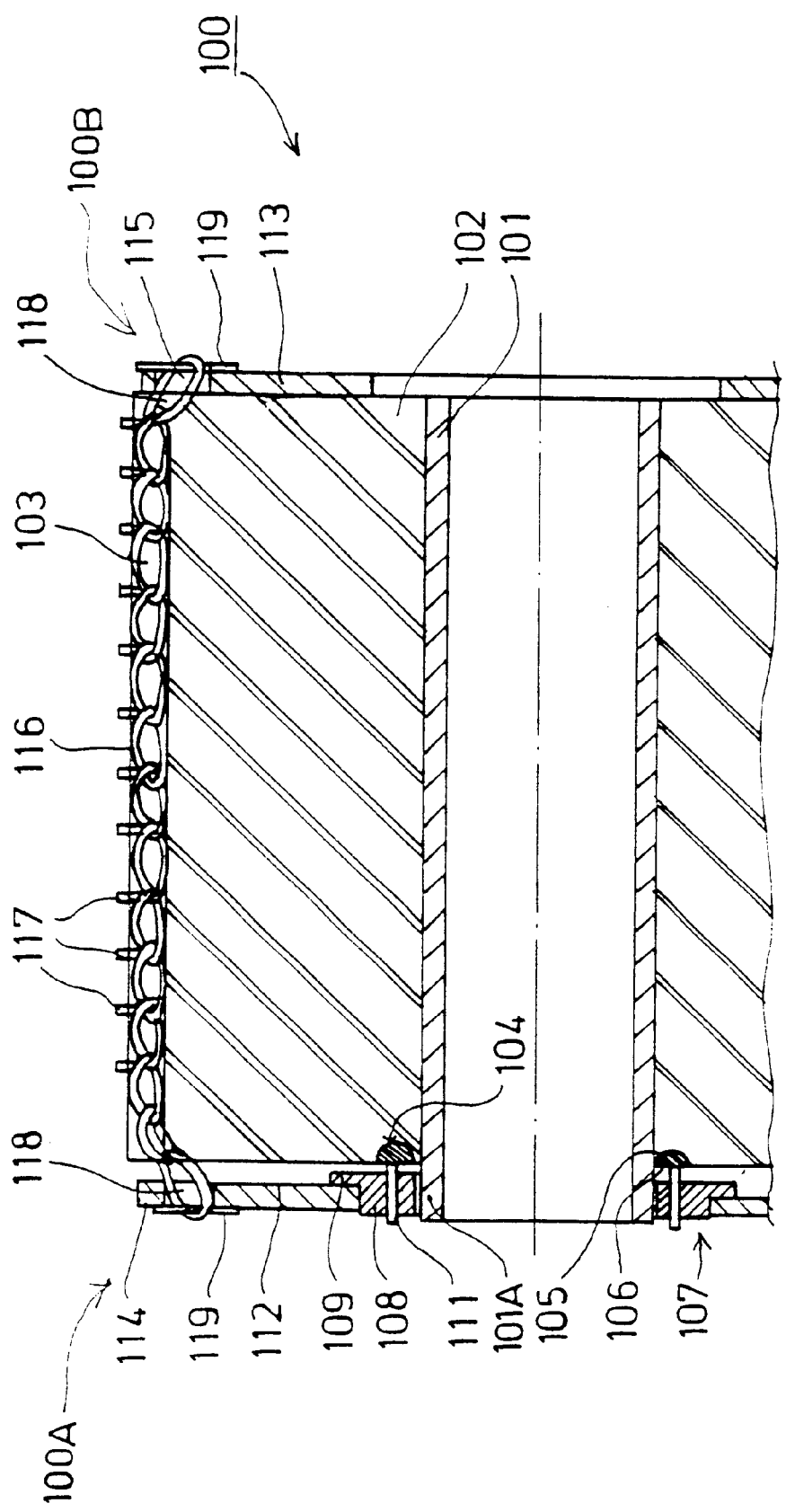
FIG. 2B is a partial cross sectional view of the drive wheel of FIG. 2A.

The delimbing and cutting head is also provided with drive wheels 100 which grip the tree trunk on opposite sides thereof. The drive wheels 100 are mounted on pivoting arms 120, which have been mounted to be turnable with the aid of pivoting axles 121 on the body 22 of the delimbing and cutting head. The drive wheels 100 are provided with requisite drive means, preferably hydraulic motors (not shown), whereby the wheels can be rotated in both directions. Furthermore, the drive wheels 100 are provided with power equipment, such as hydraulic cylinders (not shown), whereby the drive wheels can be compressed with desired force against the tree trunk. The structure of the drive wheels is presented in more detail in FIGS. 2A and 2B.

The drive wheel 100 comprises a hub liner 101 serving as the hub, whereon an elastic material has been adhered, such as a material layer 102 of rubber, preferably by curing. In the outer surface of the elastic material layer 102, grooves 103 are formed, extending most appropriately in an axial direction across the material layer 102. At a first end 100A of the drive wheel 100, the hub liner 101 extends in axial direction preferably a space over the elastic material layer 102 so that a short projecting part 101A out of the hub liner is formed at the first end 100A of said drive wheel. Respectively, at the other end 100B of the drive wheel, the hub liner 101 and the elastic material layer 102 extend appropriately to the same extent. In the material layer 102, which is preferably made of rubber, an annular groove 104 is formed at the first end 100A of the drive wheel 100, the diameter thereof being slightly greater than the diameter of the hub liner 101. A metallic support ring 105 is disposed in said annular groove 104, on one side of which, that is, on the side directed outwards from the drive wheel 100, a low groove 106 has been mechanically worked.

On top of the projecting part 101A of the hub liner 101, a flange ring 107 is disposed, the inner diameter whereof being greater than the outer diameter of the hub liner so that the flange ring 107 is positioned on the projecting part of the hub liner with a loose clearance, whereby said flange ring 107 is not supported by the projecting part 101A of the hub liner. The flange ring 107 is comprised of the hub part 108 and of a flange part 109 extending to the elastic material layer, such as the rubber layer 102. In the hub part 108 are formed threaded holes 110 with screw threads and extending axially therethrough, in which screws 111 are disposed, preferably being hexagonal socket-head screws. The division of the threaded holes 110 in the hub part 108 of the flange ring 107 is such that the diameter of the division circle is substantially equal to the diameter of the groove 106 formed in the support ring 105. Hereby, the screws 111 threaded through the threaded holes 110 can be supported against the groove 106 of the support ring. Deviating from what is said in the preceding, no projecting part 101A is needed in the hub liner 101. In the present context, said projecting part is merely used for facilitating the assembly. The assembly may, however, be carried out also with other auxiliary means. In fact, it would be advantageous if the drive wheel 100 is identical on both sides, so that it could be used either way. In such instance it would be most preferable that the hub liner is not provided with any projecting parts. Another alternative would be, though less advantageous one, to provide the hub liner with a projecting part at both ends.

Around the hub part 108 of the flange ring 107, a first fixing flange 112 is disposed, the diameter of the center hole of which is greater than the outer diameter of the hub part 108 of the flange ring so that the said first fixing flange 112 is provided with loose slide clearance on top of the hub part 108 of the flange ring 107. Respectively, a second fixing flange 113 is disposed on the other end 100B of the drive wheel 100, being advantageously identical with the first fixing flange 112. Consequently, holes 114,115 are formed in each of the fixing flanges 112,113, whereby the fixing of chains 116 with the fixing flanges 112,113 is achieved. The flange ring 107 and the first fixing flange 112 could be made of one and same piece, but considering the production technology, it is preferred to have the flange ring 107 and the first fixing flange 112 made as separate pieces. In an instance in which the flange ring 107 and the first fixing flange 112 are made of one and same piece, the threaded holes 110 are made directly in said fixing flange, respectively, the screws 111 are screwed in the threaded holes so that the distance of the fixing flange from the metallic support ring 105 can be adjusted with the screws 111.

The chains 116 are comprised of short pieces cut to size and extending across the axial length of the drive wheel 100, which are placed, when assembling the wheel, in the grooves 103 formed in the outer surface of the elastic material layer 102. The last links of both ends of chains 116 serve as fixing links 118, or fixing links 118 are arranged on both ends of the chains, these being drawn through the apertures 114,115 of the fixing flanges 112,113. The fixing of chains 116 to the fixing flanges 112,113 is secured with fixing pins 119 or in equivalent manner. As in FIGS. 2A and 2B, the chains 116 are provided with non-skid pins 117.

The chains 116 are placed in the grooves 103 formed in the elastic material layer 102 so that the chains 116 are supported along their entire length in said grooves and only the non-skid pins 117 of the chains 116 extend outside the material layer. The chains 116 are fixed in the fixing flanges 112,113, which are supported merely to the elastic material layer 102, not to the metallic hub liner 101 at all. The pretightening of the chains 116 is carried out with screws 111 by having the flange ring 107 recessed and thus, the first fixing flange 112 from the metallic support ring 105 disposed in the annular groove 104 of the elastic material layer 102. The other fixing flange 113 is in this case supported against the elastic material layer 102 at the other end 100B of the wheel. Depending on the force of the tightening force employed, the first fixing flange 112 bends and becomes to some extent cup-like and acts like a cup spring. Thus, the pretightening of the chains 116 is carried out by pressing the elastic material layer 102 of the drive wheel 100 and utilizing the elasticity of said material layer 102. For chains 116, a threaded chain with a wide surface area is preferred. This kind of chain is supported to the elastic material in a wide area and therefore, it will not wear the material. The chain can be e.g., a chain similar to the non-skid chain used for work machines. By means of the structure of the drive wheel as in the invention, a good grip to a tree trunk can be achieved when the drive wheels are adapted to the shape the tree trunk. Thanks to this method, lesser compression forces between the drive wheel and the tree trunk are needed, which is a significant advantage considering that the trunk will not be broken and the bark not detached.

In the preceding, the invention is described by way of example, reference being made to the figures of the accompanying drawing. However, the invention is not exclusively restricted to the example presented in the figures; instead, other variations of the invention are possible and are considered within the scope of the present invention.

We claim:

1. A delimbing and cutting head of a harvesting machine, comprising:

a body (22) mounted on the boom of the machine to be tiltable and rotatable, which is provided with at least one pair of grip arms (14,16) articulately mounted on the body (22) for gripping a tree trunk, whereby the grip arms (14,16) are at least on one edge so sharpened that they simultaneously serve as delimbing blades, a cutting saw (19), and at least one pair of drive wheels (100), in which the drive wheels (100) are provided with drive means so that the drive wheels (100) are rotatable in both directions of rotation, and which drive wheels (100) are mounted on the body (22) to be turnable with the aid of pivoting arms (120), wherewith the drive wheels (100) are adapted to grip the tree trunk on opposite sides of the tree trunk, each drive wheel (100) comprising a hub liner (101) made of metal, to which an elastic material layer (102) is attached and on top of which drive wheel (100) chains (166) have been disposed for enhancing the grip between the drive wheel (100) and the tree trunk, wherein the drive wheel (100) is provided with fixing means (105 through 112, 114, 119; 113, 115, 119) at both its ends (100A, 100B) for securing said chains, whereby the chains (116) being structured and arranged to be secured to said fixing means (105 through 112, 114, 119; 113, 115, 119) and pretightened in place so as to compress the elastic material layer (102) in an axial direction of said drive wheel;

wherein at a first end (100A) of the drive wheel, the fixing means (105 through 112, 114, 119; 113, 115, 119) comprises a metallic support ring (105) arranged adjacent the elastic material layer (102), a first fixing flange (112) coupled to said support ring and of means for adjusting a relative distance between the support ring (105) and the first fixing flange (112).

2. The delimbing and cutting head according to claim 1, wherein in the outer surface of the elastic material layer (102), grooves (103) have been formed in said axial direction of said drive wheel, and that the chains (116) are disposed substantially along their entire length in said grooves (103).

3. The delimbing and cutting head according to claim 1, wherein the means for adjusting the distance between the metallic support ring (105) and the first fixing flange (112) comprises a flange ring (107), wherein threaded axial through holes (110) are formed, and screws (111) disposed into the threaded holes, whereby the first fixing flange (112) is supported to the flange ring (107) in an axial direction on one side and the screws on the other side of the flange ring (107) are adjustably supported against the metallic support ring (105).

4. The delimbing and cutting head according to claim 1, wherein the means for adjusting the distance between the metallic support ring (105) and the first fixing flange (112) comprises threaded axial through holes (110) formed in said fixing flange and screws (111) disposed in the threaded holes, whereby the screws passing through the first fixing flange (112) are adjustably supported against the metallic support ring (105).

5. The delimbing and cutting head according to claim 1, wherein the fixing means at the other end (100B) of the drive wheel are comprises a second fixing flange (113) supported directly to the elastic material layer (102).

6. The delimbing and cutting head according to claim 1, wherein the chains (116) are provided with non-skid pins (117) and so disposed in the grooves (103) formed in the elastic material layer (102) that only the non-skid pins (117) extend beyond said groove.

7. The delimbing and cutting head according to claim 1, wherein the chains (116) comprise threaded chain.

8. The delimbing and cutting head according to claim 1, wherein the elastic material layer (102) is a rubber material.

9. A delimbing and cutting head for a harvesting machine comprising:

a body mountable on a boom of said machine and being tiltable and rotatable relative to said machine;

at least one pair of grip arms articulately mounted on said body for gripping a tree trunk, each one of said pair of grip arms having at least one sharpened edge for delimbing said tree trunk;

a cutting saw coupled to said body;

at least one pair of drive wheels, each one of said pair of drive wheels coupled to a pivoting arm coupled to said body, each one of said pivoting arms being structured and arranged for enabling the positional adjustment of each of said drive wheels on either side of said tree trunk;

means for driving said pair of drive wheels;

wherein each of said drive wheels comprises a hub liner, an elastic material layer arranged around said hub liner, a plurality of chains arranged axially across said elastic material layer and means arranged on first and second sides of said wheel for securing said plurality of chains, said means for securing said plurality of chains being structured and arranged for enabling a pretighting of said plurality of chains so that upon said pretightening of said chains said elastic material layer is compressed in an axially direction;

wherein said means arranged on first and second sides of said wheel for securing said plurality of chains comprise a first and second fixing flange, each one of said first and second fixing flanges being arranged on a respective side of said tire, each of said first and second fixing flanges including a plurality of throughbores each of said throughbores structured and arranged for receiving one of said plurality of chains; and means for securing a first end of each of said chains to said first fixing flange and means for securing a second end of each of said chains to said second fixing flange; and a support ring coupled to a sidewall of said elastic material layer, said support ring being adjustably coupled to said first fixing flange for enabling the adjustment of the relative positions of said fixing flange and said support ring.

10. The delimbing and cutting head for a harvesting machine according to claim 9, wherein said elastic layer includes an outer surface and a plurality of axially arranged grooves formed in said outer surface.

11. The delimbing and cutting head for a harvesting machine according to claim 10, wherein each one of said plurality of chains is arranged in one of said plurality of axially arranged grooves.

12. A delimbing and cutting head for a harvesting machine comprising:

at least one pair of drive wheels, each one of said pair of drive wheels coupled to a body of said delimbing and cutting head;

wherein each of said drive wheels comprises a hub liner, an elastic material layer arranged around said hub liner, a plurality of chains arranged axially across said elastic material layer and means arranged on first and second sides of said tire for securing said plurality of chains, said means for securing said plurality of chains being structured and arranged for enabling a pretighting of said plurality chains so that upon said pretightening of said chains said elastic material layer is compressed; and a support ring coupled to said a sidewall of said elastic material layer, said support ring being adjustably coupled to said first fixing flange for enabling the adjustment of the relative positions of said fixing flange and said support ring.

13. The delimbing and cutting head for a harvesting machine according to claim 12, wherein said means arranged on first and second sides of said tire for securing said plurality of chains comprise a first and second fixing flange, each one of said first and second fixing flanges being arranged on a respective side of said tire, each of said first and second fixing flanges including a plurality of throughbores each of said throughbores being structured and arranged for receiving one of said plurality of chains; and means for securing a first end of each of said chains to said first fixing flange and means for securing a second end of each of said chains to said second fixing flange.

14. The delimbing and cutting head for a harvesting machine according to claim 12, further comprising a support ring coupled to said sidewall of said elastic material layer, said support ring being adjustably coupled to said first fixing flange for enabling the adjustment of the relative positions of said fixing flange and said support ring.

* * * * *